Nov. 10, 1959  L. HOLMES, JR  2,912,090
REMOTE CONTROL SYSTEM FOR STENOGRAPHIC MACHINES
Filed Dec. 16, 1957  8 Sheets-Sheet 3

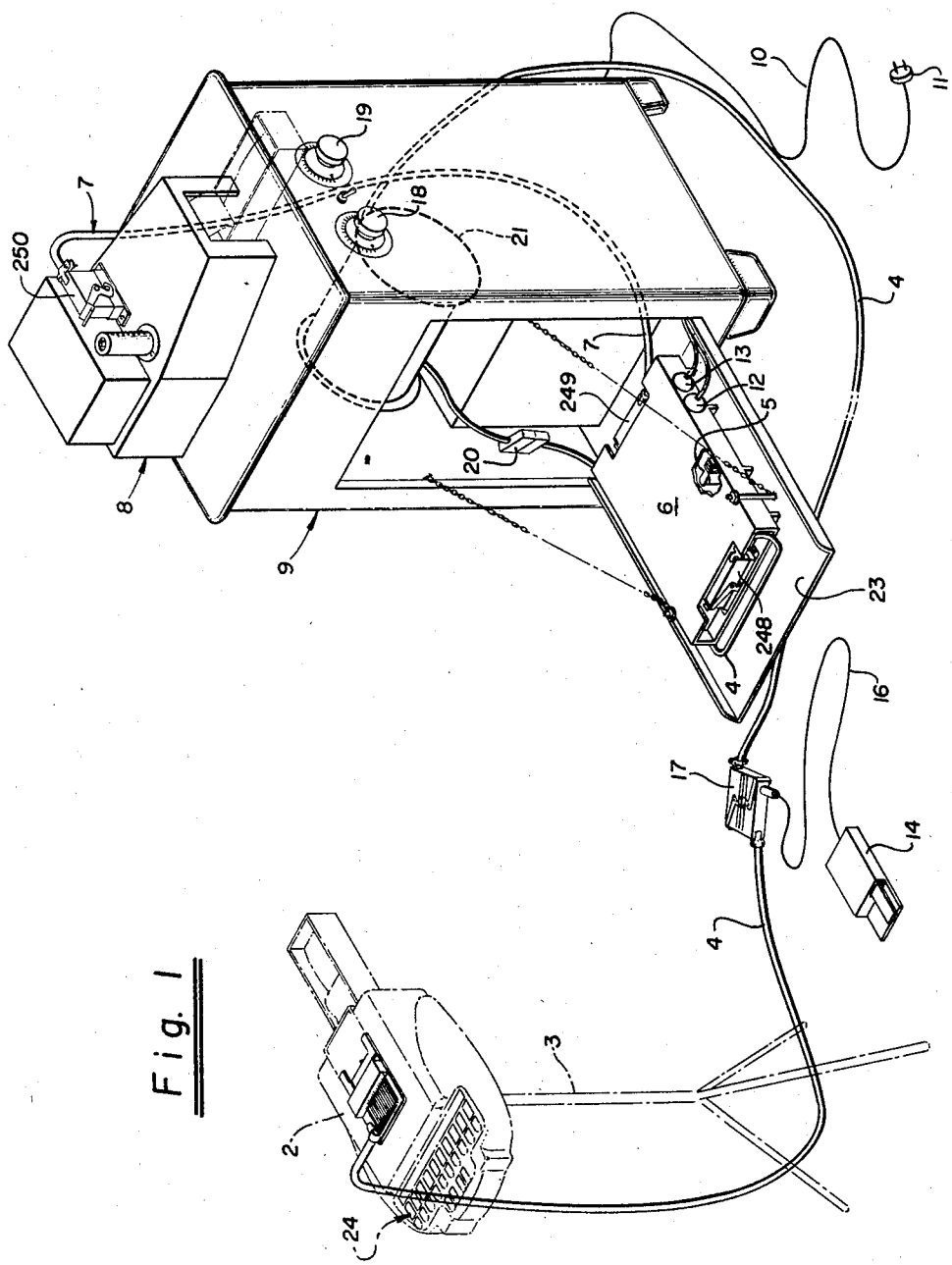

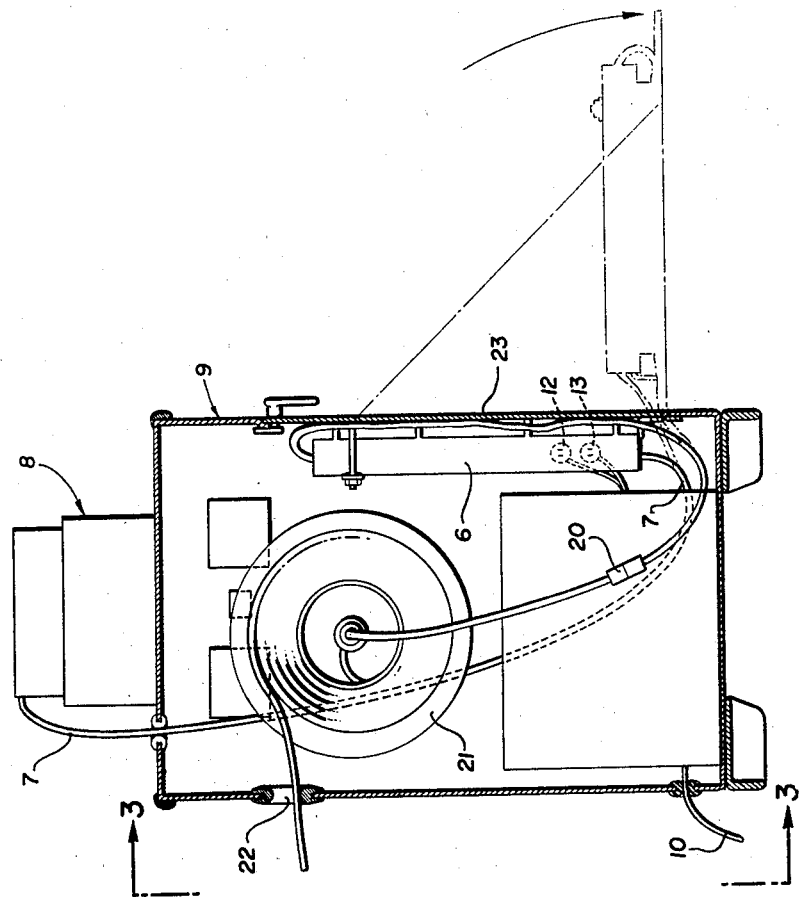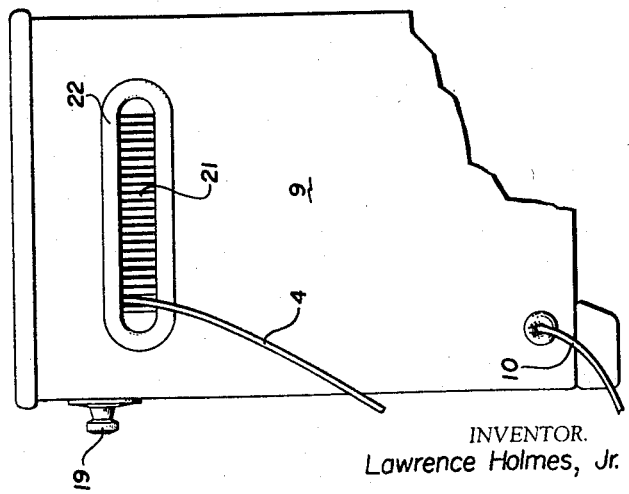

INVENTOR.
Lawrence Holmes, Jr.
BY
Fryer + Johnson
Attorneys

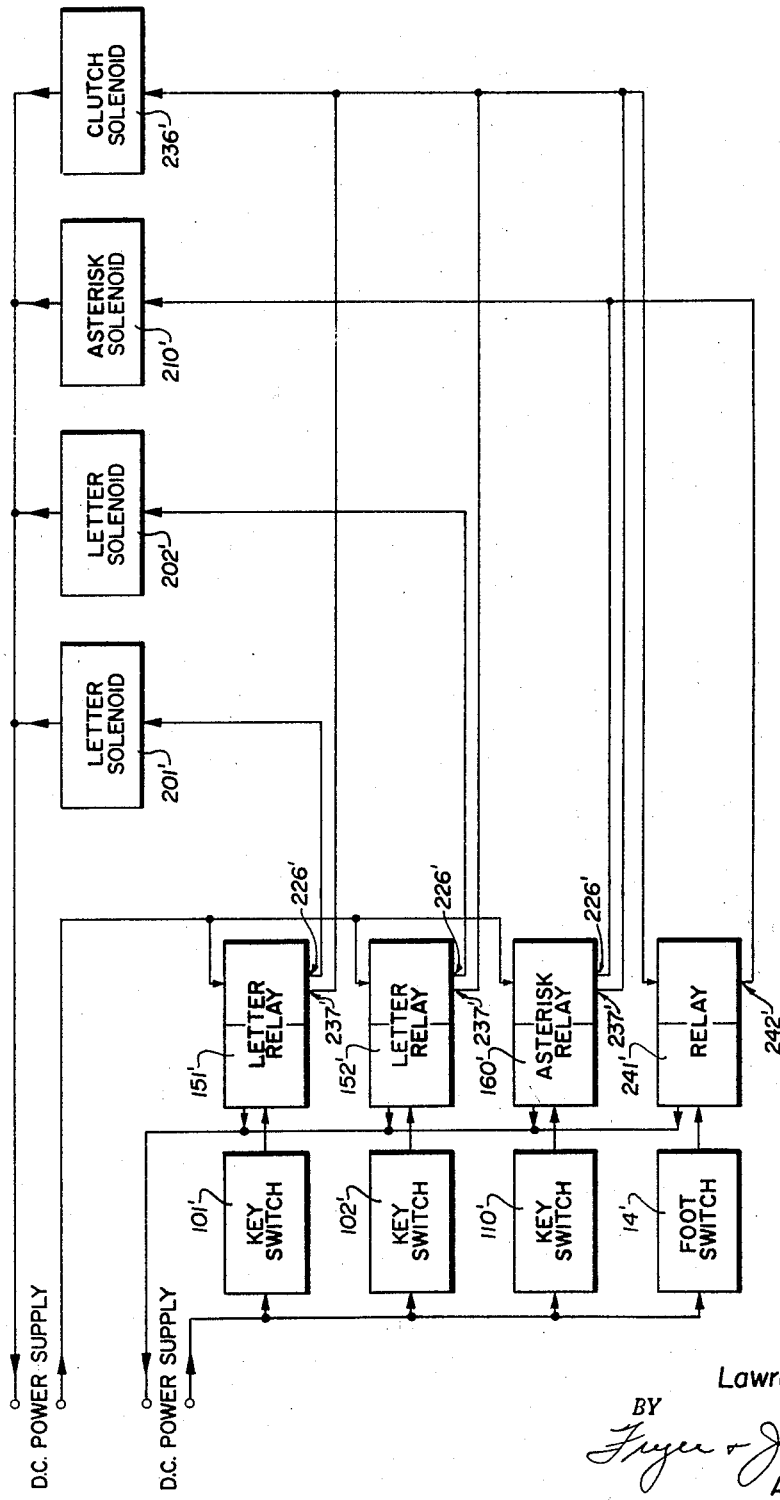

Nov. 10, 1959    L. HOLMES, JR    2,912,090
REMOTE CONTROL SYSTEM FOR STENOGRAPHIC MACHINES
Filed Dec. 16, 1957    8 Sheets-Sheet 5
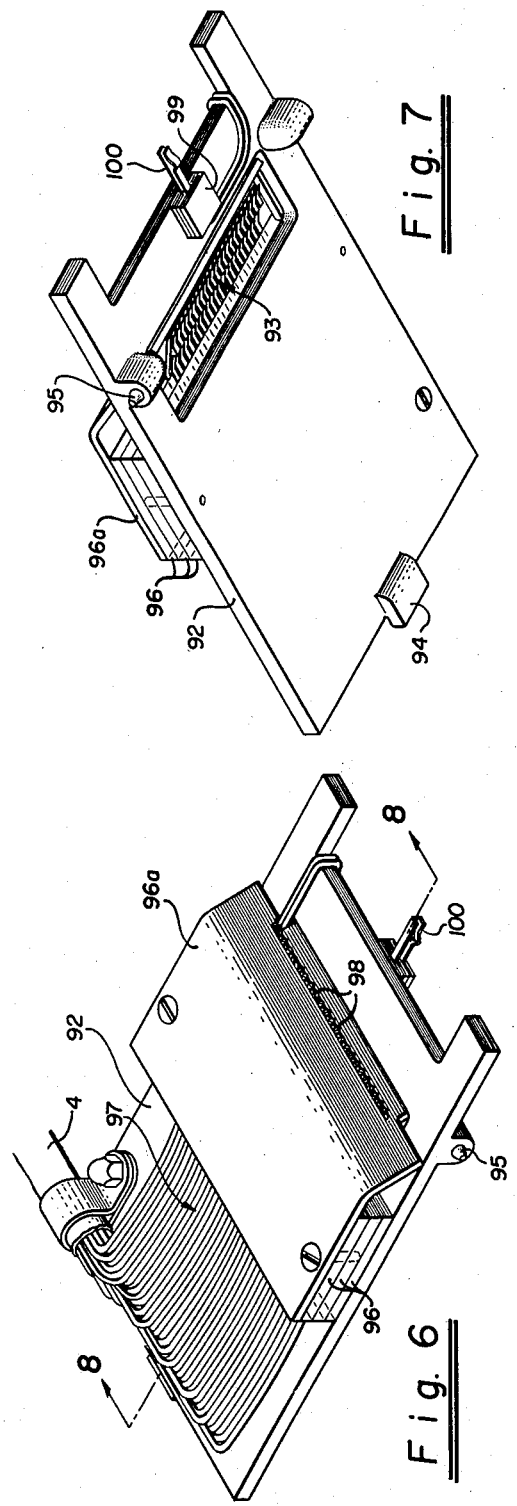
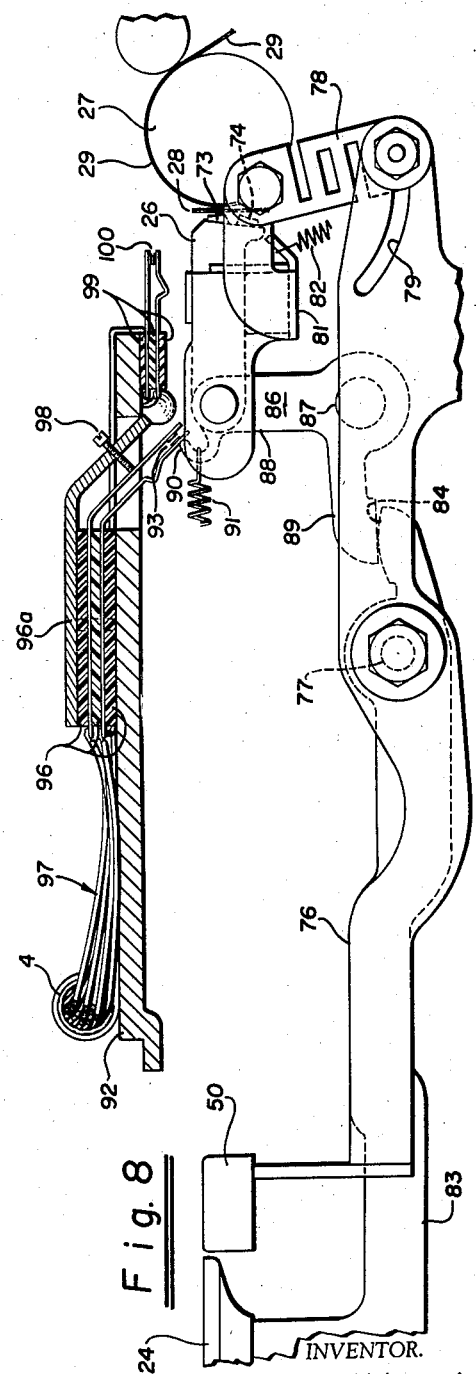
INVENTOR.
Lawrence Holmes, Jr.
BY
Fryer + Johnson
Attorneys INVENTOR.
Lawrence Holmes, Jr.
Attorneys Nov. 10, 1959     L. HOLMES, JR     2,912,090
REMOTE CONTROL SYSTEM FOR STENOGRAPHIC MACHINES
Filed Dec. 16, 1957     8 Sheets-Sheet 7

INVENTOR.
Lawrence Holmes, Jr.
BY
Fryer & Johnson
Attorneys

INVENTOR.
Lawrence Holmes, Jr.
BY
Attorneys

United States Patent Office 2,912,090
Patented Nov. 10, 1959

2,912,090

REMOTE CONTROL SYSTEM FOR STENOGRAPHIC MACHINES

Lawrence Holmes, Jr., San Bernardino, Calif.

Application December 16, 1957, Serial No. 703,192

8 Claims. (Cl. 197—5)

This invention relates to a system for controlling and operating a slave stenographic machine from a master machine, and most particularly to the provision of a remote control system for stenographic machines of the type which record language phonetically. Such machines are widely used to record the spoken word in conferences, court proceedings and for taking dictation.

When stenographic machines are employed in the court room or in conferences, an appreciable period elapses before data recorded by the machine can be transcribed to provide a record of the proceedings. Since it is frequently desirable to obtain transcriptions of proceedings with a minimum of delay, stenographic reporters often work in relays so that one reporter can take down part of the proceedings and then transcribe data from the machine at another location while another reporter replaces him to record a subsequent part of the proceedings. This procedure is not particularly efficient, and a considerable period elapses before lengthy proceedings can be completely transcribed. Furthermore, it frequently is desirable to have a single reporter take down the complete proceedings so that he will be familiar with the entire matter.

It is an object of this invention to provide a remote slave machine which duplicates information taken on the master machine so that one reporter can record proceedings continuously on the master machine while another transcribes the record as it appears on the slave machine in a different room. In this manner, a complete typewritten transcript of oral court or conference proceedings can be provided almost as soon as the proceedings have been completed.

Another object of the remote control system hereof is to enable stenographic machines of the character described to be utilized for high speed transmission of language over substantial distances. Such stenographic machines record language at a much faster rate than teletype or the like, and the slave control system enables messages to be transmitted through these stenographic machines at high speed. Furthermore, a number of slave machines can be operated by the same master machine.

In accordance with this invention and as a brief summary thereof, each key on the master machine controls a switch which makes or breaks a separate electric circuit. When the master machine key is depressed to make the circuit, a solenoid is energized to depress a corresponding key on the slave machine. Relays are advantageously utilized in the system between the master machine and the slave machine so that the key operated switch on the master machine activates a relay circuit, and the relays in turn make a solenoid circuit to energize the solenoids on the slave machine. By this arrangement the relay circuit controlled by the master machine need only carry a small amount of current compared to the current required for energizing the solenoids in the solenoid circuit. Thus, relatively thin flexible sensitive switches can be operated by the master machine keys in the relay circuit because of the low current. Such sensitive switches are closed by a very small amount of pressure, and thus do not require any appreciable additional pressure by the operator for operation of the machine.

In stenographic machines of the type to which this invention is particularly applicable, finger operated keys press type bars against a platen over which a strip of paper is moved. Motion is imparted to the paper and to an inked ribbon by means of a universal bar and lever arrangement operated whenever any of the keys are depressed. Frequently a number of keys are pressed down at one time to print phonetic characters along a single line, and the keys combine to serve the dual purpose of actuating the universal bar and of imprinting a character. However, when a single key is depressed at one time, it imprints a character and also actuates the universal lever without help from the other keys.

Consequently, more pressure is required on a single key depressed on a line than on each of a number of keys depressed simultaneously. Although a human operator's sense of touch enables him to provide the extra pressure needed on a single key to actuate the universal bar, solenoids on the slave machine do not have this sense of touch. If the solenoids on the slave machine each have sufficient force to print the phonetic impression and activate the universal bar, a group of energized solenoids simultaneously applying the same pressure on many keys causes the type bars to print too hard and produces unreadable blurred impressions. If the force exerted by the solenoids on the slave machine is reduced to provide a satisfactory impression when a number of keys are simultaneously depressed, a single solenoid does not have sufficient force to move the universal bar and paper clutch consistently. As a result, satisfactory operation of remote control slave machines of the character described presents a problem when the key operating solenoids on the slave machine have an equal force.

This problem regarding the extra force required to actuate the universal bar and move the paper when a single key is depressed has been solved in accordance with the present invention by providing a universal circuit which is made whenever any key on the master unit is depressed. This universal circuit causes energization of a universal solenoid on the slave machine which acts on a lever to move the paper and the ribbon feeding device. By this arrangement, all solenoids contacting individual keys on the slave unit can have an equal and optimum amount of force for making an impression on the paper, since the work of moving the paper is accomplished by a separate universal solenoid not associated with any particular key.

In addition when a slave machine is utilized a distance apart from the master machine, it is often desirable to call the attention of the transcriber using the slave machine to a particular portion of the material being reported. For example, the court may wish to have a copy of a portion of court proceedings transcribed immediately and brought into court. Applicant has taken care of this contingency by providing a switch which can be closed by the reporter operating the master machine to make a circuit to a special signal key operating solenoid whenever any key is pressed on the master machine. In this manner a signal indicia is imprinted on the paper together with the phonetic indicia as long as the operator's signaling switch is closed.

In the drawings:

Fig. 1 is a more or less schematic pictorial representation of the remote control system for stenographic machines.

Fig. 2 is a vertical section through the cabinet which serves as a support for the slave unit and which houses the relay system, cable drum and power converting system.

Fig. 3 is a side elevation of the cabinet taken in a direction indicated by 3—3 in Fig. 2.

Fig. 5 is a simplified wiring diagram for two phonetic keys illustrating the principle of this inventon.

Fig. 6 is an isometric view of the top of the switch plate hereof attached to the master machine.

Fig. 7 is an isometric view from below of the master machine switch plate.

Fig. 8 is a section through the switch plate of the master machine taken along 8—8 of Fig. 6 together with a detail view of the key and the figure bar illustrating the manner in which they operate on the switches.

The general system

Figure 4:
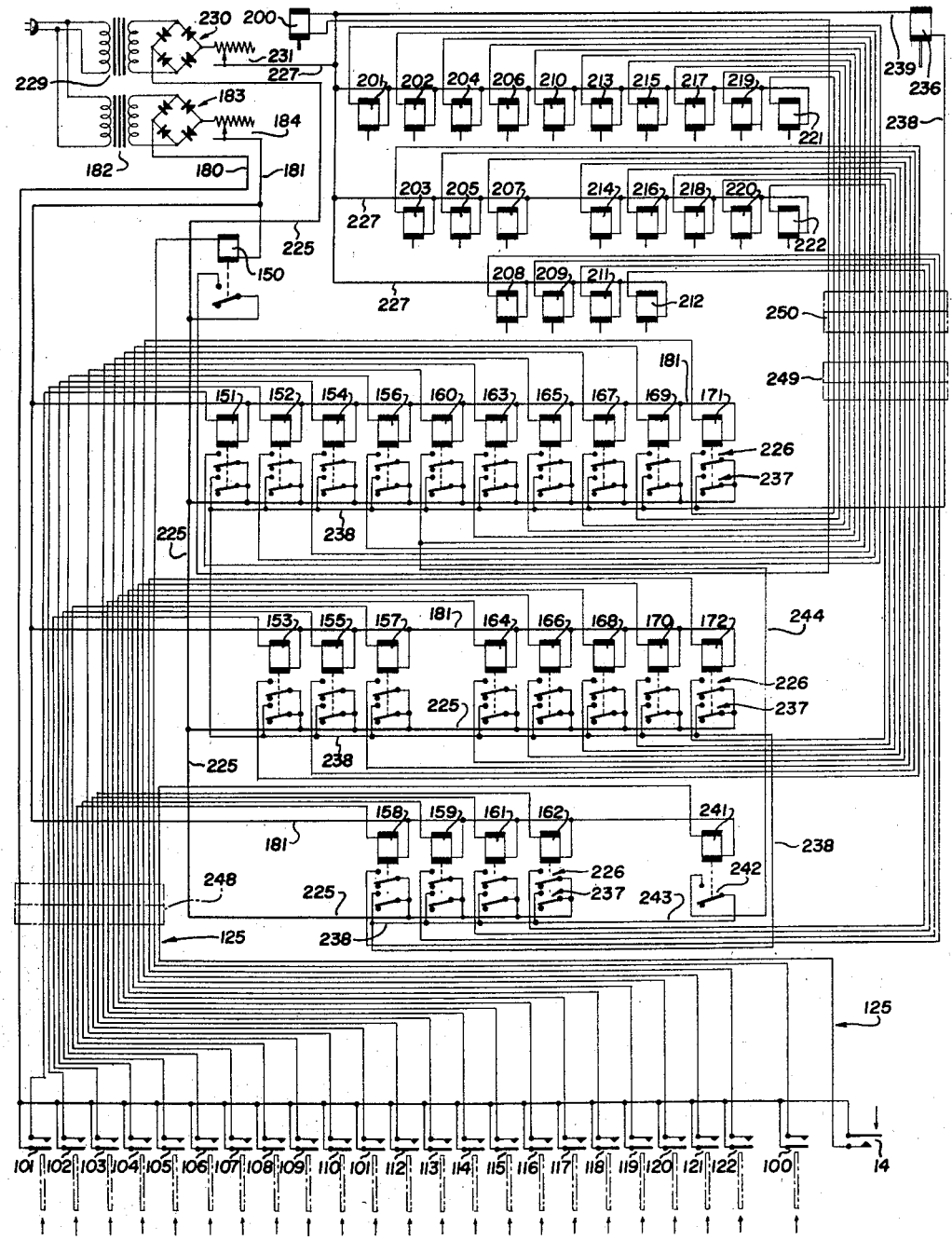
Fig. 4 is a wiring diagram of the remote control system.
Figure 9:
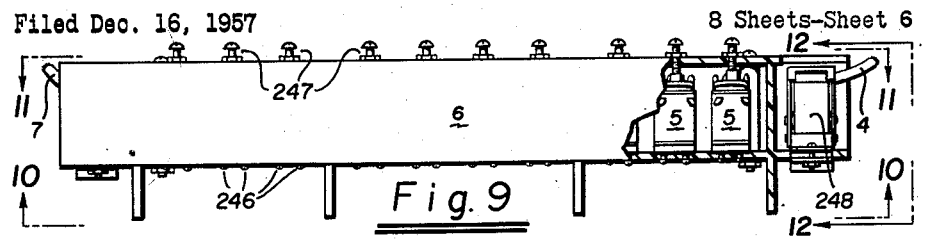
Fig. 9 is a side elevation of the relay housing with a portion broken away to show the relays.
Figure 10:
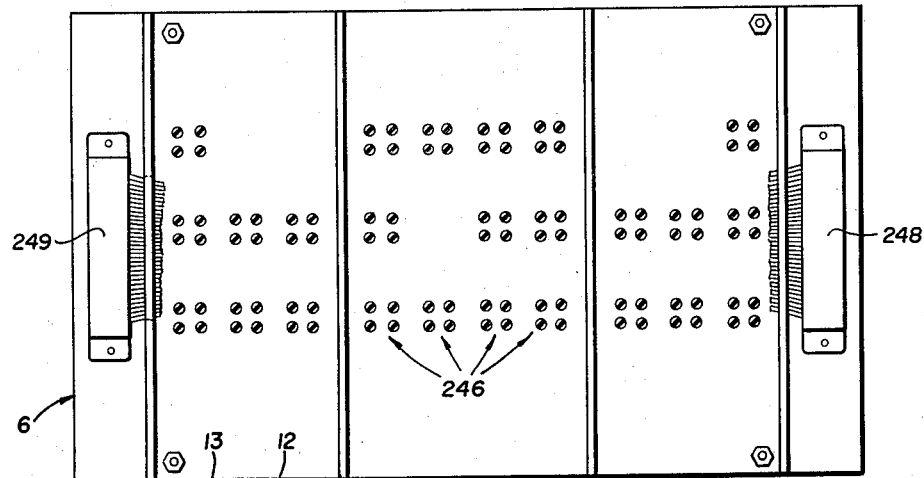
Fig. 10 is a view of the bottom of the relay housing taken in a direction indicated by 10—10 in Fig. 9.
Figure 11:
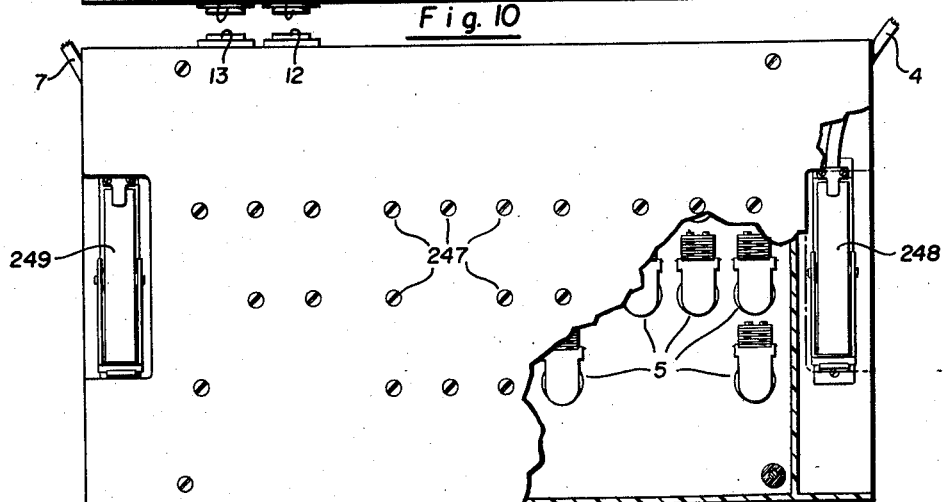
Fig. 11 is a view taken in the direction indicated by 11—11 in Fig. 9 with part of the relay housing broken away to show the relays.
Figure 12:
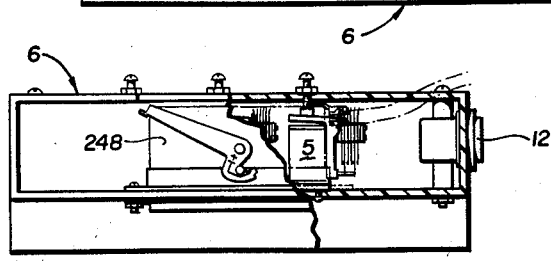
Fig. 12 is an end elevation of the relay housing in a direction indicated by 12—12 in Fig. 9 with parts broken away to show the relays more clearly.

With reference to Fig. 1, the remote control system is controlled by a master machine 2 on stand 3. Relay circuit cable 4 carries instructions from master machine 2 to relays generally indicated as 5 in relay housing 6. From relay housing 6, a solenoid circuit passes through cable 7 to the slave machine 8 seated on cabinet 9.

Power for the relay circuit and the solenoid circuit is supplied through A.C. electric power line 10 fitted with plug 11. After being converted to D.C., the electric power is introduced into the relay circuit through plug 12 and into the solenoid circuit through plug 13.

Foot control switch 14 is connected to the relay circuit cable 4 through electric wiring cord 16 at connector 17 to provide for a separate asterisk signal on the slave machine whenever any key is pressed on the master machine and foot switch 14 is closed. Rheostat control dial 18 controls the current in the relay circuit cable 4, and rheostat control 19 controls the current in the solenoid circuit passing through cable 7.

In order to permit separation of the master machine and the slave machine by considerable distances, a substantial intermediate portion of the relay circuit cable 4 is connected by plug connector 20 and is wound on cable drum 21 within cabinet 9, as best shown in Figs. 2 and 3. The cable 4 can be unplugged and unwound from cable drum 21 and pulled through porthole 22 in cabinet 9. Relay housing 6 is conveniently located on cabinet door 23, which can be swung outwardly from the cabinet for ready access to the relay housing.

The general stenographic machine

The type of machine to which this invention is applicable is exemplified by the machine described in United States Letters Patent No. 2,319,273, No. 2,387,- 330, No. 2,392,078 and No. 2,393,781, and by the well known reporting machines sold under the names "Stenotype" and "Stenograph." Such machines have a plurality of keys 24 which are operatively connected to type bars 26 acting against a platen 27, as best shown in Fig. 8. Between type bars 26 and platen 27 is an inked ribbon 28. Paper 29 is fed between ribbon 28 and platen 27. As any key or combination of keys 24 are depressed, the corresponding type bar or bars 26 are moved against ribbon 28 to make an impression on paper 29. Platen 27 is rotatably mounted on the machine, and driving means operatively connected to keys 24 through suitable mechanism hereafter described, rotates the platen 27 during a depression stroke of the keys. At the end of the stroke an impression is made on paper 29 corresponding to the key that was depressed.

Figure 14:
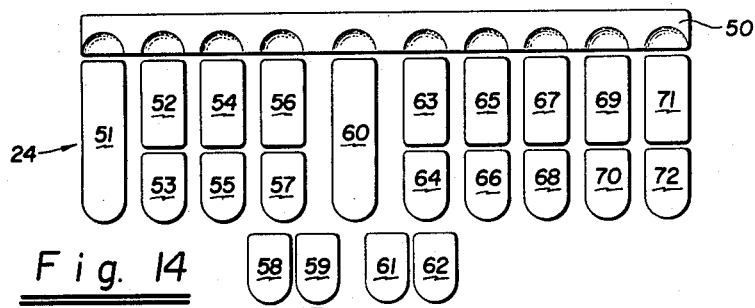
Fig. 14 is a view illustrating the keyboard of the stenographic machine.

Both the master and slave machine are the same except for the modifications and additions of this invention which are hereafter described in greater detail. As best shown in Fig. 14, there is numeral bar 50, and twenty-two keys generally indicated as 24, of which twenty-one, namely 51 to 59 and 61 to 72 represent letters of the alphabet. By pressing combinations of these letters, language can be recorded phonetically. The twenty-second key indicated at 60 represents an asterisk. As shown in Fig. 8, each of the type bars 26, with the exception of bar 26 controlled by asterisk key 60, has two types 73 and 74 embossed on its end. The asterisk type bar is used in conjunction with numeral bar 50 for spacing the paper forward without leaving an impression on the paper. The type on the aligned type bars is arranged in an upper and lower row with the upper row type 73 normally in operative alignment with the platen.

Numeral bar 50 extends the full length of the keyboard and its is operatively connected to the bank of type bars 26 so that upon depressing the numeral bar, the type bars 26 are pivoted to raise the ends of the bars and bring the lower set of type 74 into operative alignment with platen 27. As best shown in Fig. 8, the numeral bar 50 is attached to spaced numeral bar levers 76, which are fulcrumed at 77. Link 78 is adjustably secured to numeral bar levers 76 in slot 79. Upon depressing numeral bar 50, numeral bar levers 76 pivot about fulcrum 77 and raise cradle 81 through connecting link 78. Spring 82 is in tension and resiliently holds cradle 81 in its normal operating position so that upper type bar 73 which contains the letters will be imprinted against platen 27 when numeral bar 50 is not depressed.

Keys 24 are secured to the ends of levers 83 which are pivoted about fulcrum point 77 and terminate with upwardly turned surfaces 84. Each surface 84 engages an arm of a corresponding bell crank lever 86, and the levers 86 are mounted on a bell crank shaft 87. Bell crank levers 86 have upwardly extending arms 88 and substantially horizontal arms 89, the latter of which have relatively flat surfaces for engaging the surfaces of the corresponding key lever 83. At the free end of the upwardly extending arm 88 of each bell crank lever, a corresponding type bar 26 is pinned.

As a key 24 is depressed thereby rotating a key lever 83 about its axis, the cooperating faces of its upwardly turned surface 84 and the corresponding bell crank lever 86 respectively transmit the thrust on the key through the bell crank to rotate upwardly extending arm 88 in a clockwise direction as viewed in Fig. 8, thereby moving a type bar 26 towards platen 27. Each upwardly extending arm 88 of bell crank lever 86 has an integral hook 90 to which is attached a tension spring 91. Springs 91 normally urge type bars 26 and upwardly extending arms 88 of the bell crank levers in a direction away from the platen 27. When a key 24 is pressed downwardly, the upwardly extending arm 88 of the corresponding bell crank lever urges a type bar 26 against the action of spring 91 towards platen 27 to make an imprint on paper 29. The force of spring 91 on an upwardly extending arm 88 of a bell crank returns the corresponding type bar 26 to its normal position when the pressure of the reporter's finger on a key 24 is released.

The master machine

Stenographic machines of the character described customarily have plates fitted on the machine frames above springs 91 to facilitate inking the ribbon within the machines. The master machine 2 hereof is fitted with a similar plate except that plate 92 hereof is provided with a plurality of switches generally indicated as 93, as best shown in Figs. 6 through 8. There is the switch corresponding to each of the keys 24, and these normally open, pressure operated switches extend inwardly of plate 92 towards upwardly extending arms 88 of bell cranks 86. Whenever a key 24 is pressed downwardly to urge its corresponding type bar 26 towards platen 27, the upwardly extending hook 90 attached to the bell crank contacts one arm of pressure responsive switch 93 and closes the switch to make a circuit. Plate 92 is attached to master machine 2 by means of a downwardly extending flange 94, and spring loaded clips 95. The arms of switches 93 are mounted on plate 92 between layers of insulating material 96, and conductor wires generally indicated as 97 pass from the switch terminal arms through cable 4.

Spacing screws 98 attached to a cap of relatively rigid insulating material 96a extending over the contacts of switches 93 enable the spacing between the contact points of switches 93 to be adjusted so that pressure on keys 24 readily closes the switches. Also, the lower end of plate 92 adjacent platen 27 is provided with layered insulating material 99 on which is mounted numeral switch 100. This numeral switch 100 is closed by pressure of the type bar carriage when numeral bar 50 is pressed downward to raise type bars 26 in the manner previously described. By this switch arrangement keys 24 as well as numeral bar 50 close corresponding switches when the numeral bar or keys are depressed.

Circuit

The twenty-two switches generally indicated as 93 in Fig. 8, correspond to the twenty-two keys 24. As shown in Fig. 4, the individual switches designated as 101 to 109 and 111 to 122 are closed by keys 51 to 59 and 61 to 72 respectively, and asterisk switch 110 is closed by asterisk key 60. Similarly, numeral switch 100 is closed when numeral bar 50 is pressed downwardly.

One terminal of each of key operated switches 101 to 122 and numeral switch 100 is connected to a corresponding relay through conductors 125. Numeral switch 100 is connected to numeral relay 150, and switches 101 through 122 are respectively connected to relays 151 through 172. Asterisk switch 110 is connected to asterisk relay 160, which is of particular importance in the system as hereafter described. Direct current flows through any of relays 150 through 172 whenever a corresponding switch 100 through 122 is closed because of a potential difference between current in conductors 180 and conductors 181. Conductors 180 are connected to the terminals of each of switches 100 through 122 other than terminals connected to relays 150 through 177, and conductors 181 are connected to terminals of each of relays 150 through 172 to complete the relay circuit.

Any source of direct current may be employed to activate the relays 5 when the relay circuit is completed. Since alternating current is readily available in most locations, alternating current may be converted into direct current in any conventional manner. For example, alternating current may be directed through transformer 182 and rectifier 183 to provide direct current. A rheostat 184 is included in the relay circuit for control of current. From the foregoing it can be seen that any relay 150 through 172 in the relay operating circuit is energized whenever the corresponding numeral switch 100 or key switches 101 through 122 are closed to complete the relay circuit.

When any relay 150 through 172 is energized, it completes a separate solenoid circuit which energizes a corresponding solenoid 200 through 222. Numeral bar solenoid 200 corresponds to relay 150 which is activated when numeral switch 100 is closed by depression of numeral bar 50. Likewise, key solenoids 201 through 222 are energized respectively by corresponding relays 151 through 172, which are in turn controlled through switches 101 through 122 on the master machine. Asterisk solenoid 210 is energized by activation of asterisk relay 160, which in turn is controlled through asterisk switch 110 in the relay circuit. Current for the solenoid circuit is provided by a potential difference between conductors 225 connected to a terminal of contact switches 226 in each relay 150 through 172, and conductors 227 connected to a terminal of corresponding solenoid 200 through 222. Conductors 228 extending between each contact switch 226 of relays 150 through 172, and the corresponding solenoid 200 through 222 complete a solenoid operating circuit.

In a manner similar to the relay circuit, any source of direct current may be utilized in the solenoid circuit for activation of the solenoids. Since the solenoid circuit requires a much greater current than that required for energizing the relays, a separate source of current is preferred. Another reason for employing two sources of power, one for the relays and one for the solenoids, is the increased line loss when the cable 4 is lengthened to permit the slave machine 8 to be located a greater distance from master machine 2. With a separate source of power, the line loss can be made up by increasing the power in the relay circuit without affecting the current in the solenoid circuit. As shown in Fig. 4, alternating current for the solenoid circuit is conveniently passed through transformer 229 and rectifier 230 to provide direct current. Rheostat 231 provides a control over the current in the solenoid circuit.

As previously discussed, stenographic machines of the character described require more pressure when a single key is pressed since the key both provides an imprint on the paper and actuates the universal lever to move paper 29 over platen 27. Although the operator's sense of touch enables him to use extra pressure when a single key is depressed at one time, the solenoids on slave machine 8 do not have this sense of touch. This problem is solved by the provision of a separate universal solenoid 236 which is energized whenever any key 51 through 72 is depressed.

The universal solenoid is energized when any of relays 151 through 172 is activated by means of a separate relay contact switch 237 on each of such relays. Any relay switch 237 is closed to make the circuit to universal solenoid 236 when any relay 151 through 172 is energized by a corresponding key. One terminal of each relay contact switch 237 is connected to conductor 225 in a manner similar to relay contact switch 226. However, the other terminal of the additional relay switch 237 is connected to a conductor 238 which is in turn connected to a terminal of universal solenoid 236. The other terminal of universal solenoid 236 is connected by conductor 239 to conductor 227 to provide a direct current when a relay contact switch 237 is closed.

From the foregoing it can be seen that the depression of any key 24 results in closing of a corresponding switch 101 through 122, and energization of a corresponding relay 151 through 172. The energized relay makes a contact 226 in a solenoid circuit leading to its individual solenoid 201 to 222, and also makes a relay contact switch 237 in a circuit controlling universal solenoid 236, which in turn causes paper 29 to advance over platen 27 and also operates a ribbon feed.

Another important feature provided by the circuit illustrated in Fig. 4 is a signaling means by which a signal indicia is imprinted on slave machine 8 to call attention to particular portions of the material transmitted from master machine 2. Repeated asterisk symbols on each line of the paper on slave machine 8 are ideal for making such a signal. This asterisk signal is obtained when the operator of master machine 2 closes convenient foot switch 14 and presses any of keys 51 through 72, thereby energizing signal relay 241. The relay circuit for the signal relay is similar to that of the relay circuits through switches 101–122. Conductor 180 connected to a terminal of switch 14, and conductor 181 from signal relay 241 are at a different potential to cause a flow of current when switch 14 is closed and a key 51 through 72 is depressed. A conductor 125 between switch 14 and signal relay 241 completes the relay circuit.

When foot switch 14 is closed and signal relay 241 is thereby energized, a signal relay contact switch is closed at 242. Current does not flow through this switch 242 even when it is closed until one of keys 51 through 72 is depressed. As previously explained in connection with the operation of universal solenoid 236, a separate relay contact switch 237 is provided on each of relays 151 through 172. When any of such relays are energized, switch 237 is closed to operate universal solenoid 236, and also to transmit current through conductor 243 connected to signal relay 241. If signal relay contact switch 242 is closed to make the circuit, conductor 244 connects the circuit directly with asterisk solenoid 210 and by-passes asterisk relay 160. Thus asterisk solenoid is activated whenever foot switch 14 is closed and any key 51 through 72 is depressed to energize a relay 151 through 172.

The principle of the remote control system is perhaps most readily illustrated by the modified and reduced wiring diagram in Fig. 5 which shows the circuit for two letter keys of the master machine, for asterisk key, and for foot switch 14'. When a key closes either switch 101' or 102' or asterisk switch 110', a relay circuit is made and corresponding relay 151', 152' or 160' is energized. The energized relay makes one solenoid circuit at contact 226' which operates a corresponding key solenoid 201', 202' or asterisk solenoid 210'. By this arrangement, a key on the slave machine is depressed corresponding to the key on the master machine originally pressed by the reporter. As soon as the reporter's finger releases its pressure on the master machine key, switch 101', 102' or 110' opens to break all circuits and release the solenoid 201', 202' or 210' acting on the slave machine.

When either key operated switch 101' or 102' is closed to energize corresponding relay 151' or 152', a contact 237' is made by the relay in addition to contact universal solenoid 236'. Thus the universal solenoid 236' is energized whenever a key is depressed on the master machine, and this solves the problem of providing the extra force required to move the paper and ribbon feed with the first key depressed, as explained hereafter in greater detail. In addition foot switch 14' completes a circuit which energizes signal relay 241' which in turn closes relay contact switch 242'. Even when contact switch 242' is closed, current does not flow through the switch unless the universal solenoid 236' is activated by the closing of contact 237' in a key relay 151' or 152'. Thus closing of foot switch 14' and a key operated switch 101' or 102' with resultant closing of contact switch 237' causes energization of asterisk solenoid 210' for signaling without actuation of asterisk key.

Relays

Relay housing 6 contains relays 150 through 172 and 241, all generally indicated as relays 5. The relays are secured at the bottom of the housing by screws 246 and at the top by adjusting screws 247 for the relays which also provide a means of reducing chattering noise in the relays. Input connector 248 between relay housing 6 and cable 4 provides for transmission of signals from master machine 2 to relays 5. Likewise, output connector 249 connects relays 5 with cable 7 for transmission of current to slave machine 8. The connectors 248 and 249 contain a plurality of contact points for the individual conductors, and the connectors are preferably of the plug-in type, such as Amphenol Blue Ribbon connectors sold by American Phenolic Corporation. Similarly slave machine 8 has input plug-in connector 250 at the end of cable 7 leading to the slave machine. The plug-in connectors enable the system to be readily moved and the length of cable 4 easily extended for long distances. As previously mentioned, relay housing 6 is conveniently mounted in cabinet 9 which holds slave machine 8.

The relays employed may be of any conventional construction. However, each of relays 151 through 172 are double contact relays when the system includes the universal solenoid 236 which is actuated by any key for moving the paper. Likewise, the signaling asterisk arrangement requires the double contact relays. Thus the signaling system as well as the universal arrangement for moving paper 29 are activated through relay contacts 237, while the regular key solenoids 201 through 222 are activated through the other relay contacts 226. Unless double contact relays 5 are employed the universal arrangement would activate all the key solenoids and the system would not transmit messages.

Slave machine

Figure 15:
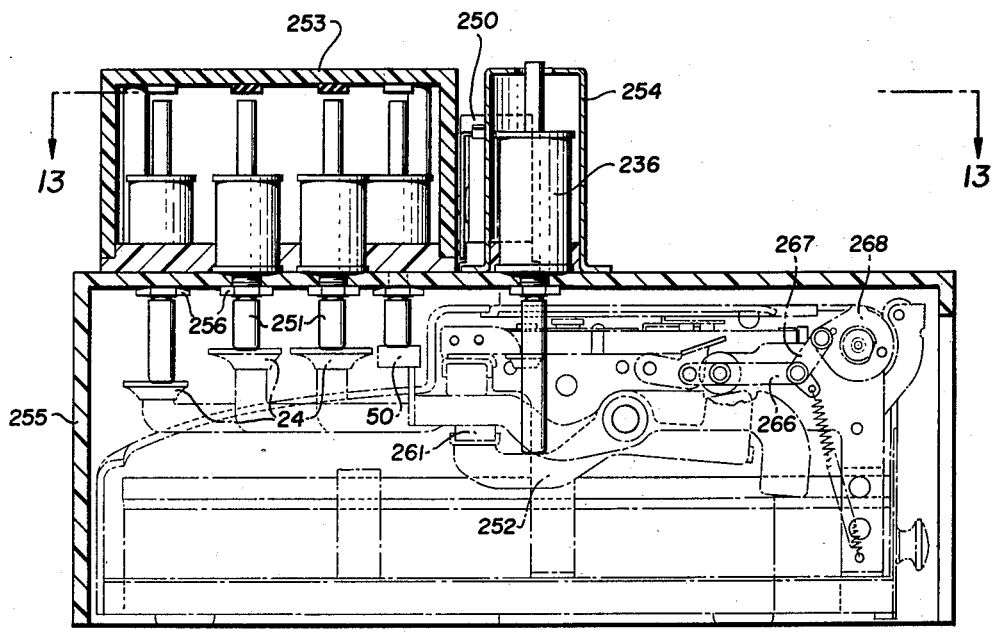
Fig. 15 is a vertical section through 15—15 in Fig. 13 showing the manner in which the solenoids are mounted on the slave machine to activate the keys and the clutch.
Figure 16:
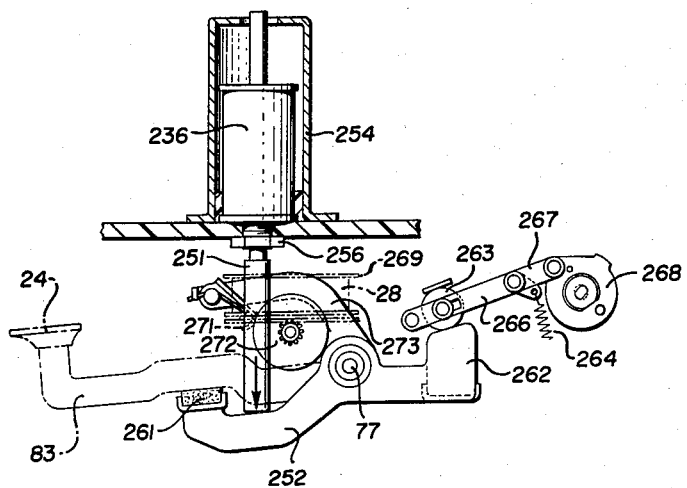
Fig. 16 is a detail view of the slave machine universal bar arrangement for advancing paper over the platen and for moving the ribbon mechanism, with the universal solenoid housing broken away.

Solenoids 200 through 222 on slave machine 8 are energized by current through conductors in cable 7. As best shown in Figs. 15 and 16, armatures 251 press downwardly on numeral bar 50 and keys 51 through 72 respectively when the solenoids are energized and thus transmit the message from master machine 2 to slave machine 8. When the key 24 is released and the solenoid de-energized, the usual spring return in the stenographic machine returns the keys to normal position. With one exception, the solenoids operate slave machine 8 in a manner similar to operation by human fingers. As previously explained, when a single key is pressed at a time, additional pressure is required because of the operation of the paper and ribbon moving mechanism. Since the solenoids do not have a human sense of touch, universal solenoid 236 takes care of this additional pressure requirement by urging universal lever 252 downwardly to move paper 29 and inked ribbon 28 whenever any key or combination of keys are pressed. Lever 252 is maintained in its down position until all of the keys are released.

Figure 13:
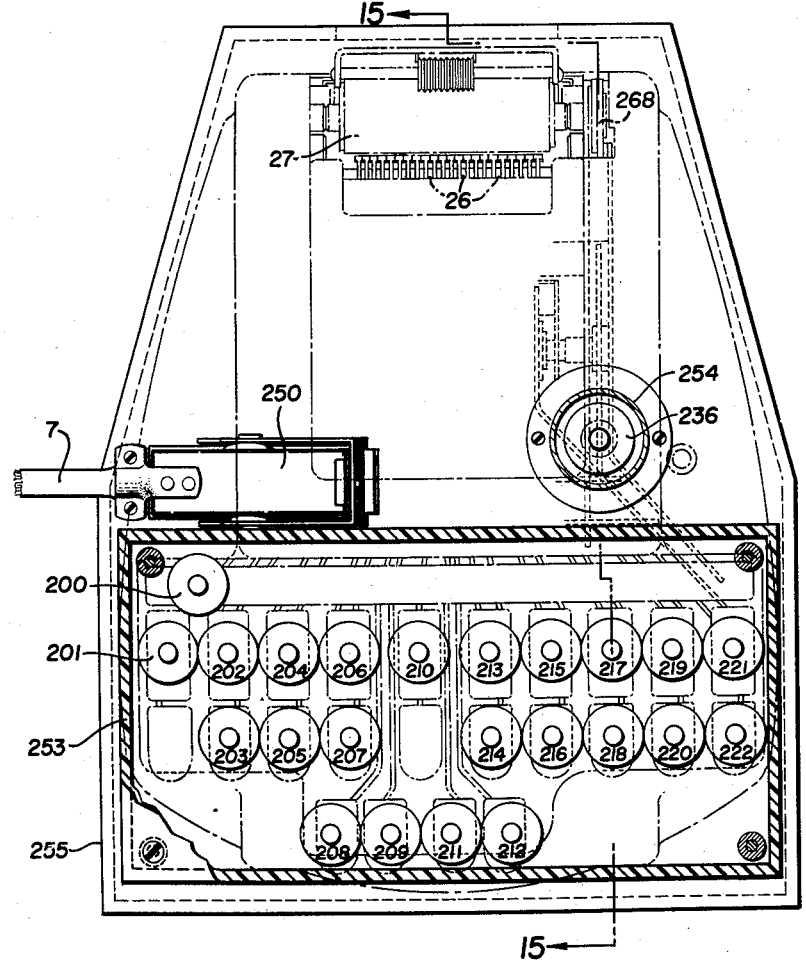
Fig. 13 is a view of the slave machine partly plan and partly in horizontal section along the line indicated by 13—13 in Fig. 15.

In the embodiment of the invention illustrated in Figs. 13, 15 and 16, solenoids 200 through 222 are mounted within housing 253, and universal solenoid 236 has its own housing 254. Case 255 for the slave machine serves as a mounting and support for the solenoids by means of mounting nuts 256 and threaded extensions 257 of the solenoids. Key solenoids 201 through 222 and numeral solenoid 200 press down the keys and number bar to provide letter and number characters printed on paper 29 as previously explained under the heading "The General Stenographic Machine" and in United States Patent No. 2,319,273.

Universal solenoid 236, which is energized whenever a key 51 through 72 is depressed, acts directly on universal lever 252 fulcrumed at 77. Universal bar 261 extends from the end of lever 252 near keys 24 across the machine to a similar lever, not shown, and the bar is normally urged downward when the first key or group of keys is depressed. However, on the slave machine 8 the armature of universal solenoid 236 does the work of depressing universal lever 252. Universal lever 252 carries upwardly extending projection 262 having an inclined upper surface, as shown in Fig. 16.

Upon energization of solenoid 236, its armature moves universal lever 258 downwardly about its pivot point 77 to raise the projecting portion 262 of universal lever 252. The projection urges against rubber disk 263 against the spring 264 attached to clutch driving link 266 until the position of Fig. 16 is reached. Normally, the links are in the position shown in Fig. 15. Link 267 is pivoted on the end of link 266, and these links exert force in a clockwise direction on clutch 268. When the pressure of the armature of solenoid 236 is released, the spring 264 pulls the links 266 and 267 back to their normal position. The rotation imparted to clutch 268 feeds paper 29 over platen 27 in a manner described in detail in United States Patents Nos. 2,319,273 and 2,393,781.

Likewise inked ribbon 28 is driven through the action of universal solenoid 236 on lever 258. Ribbon spool 269, shown in phantom lines in Fig. 16, is rotated by means of driving pawl 271 which engages rubber disk 272 to drive spool 269 as described in the aforementioned Patent No. 2,319,273. As universal lever 258 is depressed by universal solenoid 236, the lever pivots about its axis and upwardly extending arm 273 pivots along with the lever. When arm 273 rotates, it applies a torque to disk 272 through pawl 271 and thus rotates ribbon spool 269.

*Example of an operating system*

The characteristics of the components in the system may vary considerably. As in example of the components in one system, the relay circuit which controls the relays through key operated switches 100 through 122 and foot switch 14 is operated by 28 volt direct current with a current of 100 milliamps at the relays. The relays 5 are of the telephone type with at least two contacts. They are operated on from 24 to 28 volts and have a coil resistance of 300 ohms.

Also, by way of example only, the corresponding solenoid circuit is operated on 16 volts and a current of about 1¼ amp. is available at the solenoids. The solenoids 200 through 222 which operate number bar 50 and keys 51 through 72 deliver one ounce at the bottom of their stroke, and universal solenoid 236 delivers one-half pound at the bottom of its stroke.

I claim:

1. In combination first and second key operated machines that record language on paper in printed characters in which machines any number of characters are printed substantially simultaneously by actuation of the keys and motion is imparted to the paper in each machine by a universal lever upon actuation of any number of keys, means including electrical circuits connecting said machines to record characters on the second of said machines corresponding to keys actuated on the first of said machines, and a normally open circuit which controls means for actuating said universal lever on said second machine, which normally open circuit is closed prior to substantial movement of said second machine universal lever when any number of keys are depressed on said first machine.

2. A remote control system for a key operated machine that records language on paper in printed characters in which machine any number of characters are printed substantially simultaneously by actuation of the keys and motion is imparted to the paper by a universal lever upon actuation of any number of keys, which system comprises a master machine having keys that are actuated for recording language, a remote slave machine similar to the master machine and containing corresponding keys for recording language, solenoids for actuating the keys of said slave machine, normally open circuits between each of said solenoids and said master machine, switches corresponding to said keys on the master machine and closable upon actuation of such master machine keys to make circuits to the corresponding solenoids and actuate the corresponding keys on said slave machine, a universal solenoid for actuating said universal lever of said slave machine, and a normally open circuit between said universal solenoid and said master machine which is closable by any of said switches to energize said universal solenoid and thereby impart motion to the paper.

3. A remote control system for a key operated machine that records language on paper in printed characters in which machine any number of characters are printed substantially simultaneously by actuation of the keys and motion is imparted to the paper by a universal lever upon actuation of any number of keys, which system comprises a master machine having keys that are actuated for recording language, a remote slave machine similar to the master machine and containing corresponding keys for recording language, solenoids adjacent keys of said slave machine for actuating said keys, relays corresponding to the keys on said master machine and having normally open first and second contacts closable upon energization of said relays, normally open relay circuits between each of said relays and said master machine, a source of direct current for said relay circuits, master machine switches corresponding to said keys on the master machine and closable upon actuation of such master machine keys to make circuits to the corresponding relays and energize said relays, normally open solenoid circuits between said solenoids and said first contacts of said relays which circuits are respectively closed upon energization of said corresponding relays to energize said solenoids and actuate the corresponding keys on said slave machine, a universal solenoid for actuating said universal lever of said slave machine, a normally open solenoid circuit between said universal solenoid and said second contacts of said relays which is closed when any of said relays are energized by closing of any of said master machine switches thereby energizing said universal solenoid and imparting motion to the paper, and a source of direct current for said solenoid circuits.

4. A remote control system for a key operated machine that records language on paper in printed characters in which machine any number of characters are printed substantially simultaneously by actuation of keys and motion is imparted to the paper by a universal lever upon actuation of any number of keys, which system comprises a master machine having keys that are actuated for recording language, a remote slave machine similar to the master machine and containing corresponding keys for recording language, key solenoids for actuating the keys of said slave machine including a signal solenoid which acts upon one of said keys, normally open circuits between each of said solenoids and said master machine, master machine switches corresponding to said keys on said master machine and closable upon actuation of such master machine keys to make circuits to the corresponding solenoids and actuate the corresponding keys on said slave machine, a normally open signal circuit between said signal solenoid and said master machine which is partially closed upon closing of any of said master machine switches, and a separate signal switch closable to complete the signal circuit when any of said master machine switches is closed and cause repeated actuation of said signal solenoid.

5. A remote control system for a key operated machine that records language on paper in printed characters in which machine any number of characters are printed substantially simultaneously by actuation of keys and motion is imparted to the paper by a universal lever upon actuation of any number of keys, which system comprises a master machine having keys that are actuated for recording language, a remote slave machine similar to the master machine and containing corresponding keys for recording language, key solenoids for actuating the keys of said slave machine including a signal solenoid which acts upon one of said keys, normally open circuits between each of said solenoids and said master machine, master machine switches corresponding to said keys on said master machine and closable upon actuation of such master machine keys to make circuits to the corresponding solenoids and actuate the corresponding keys on said slave machine, a normally open signal circuit between said signal solenoid and said master machine which is partially closed upon closing of any of said master machine switches, a separate signal switch closable to complete the signal circuit when any of said master machine switches is closed and cause repeated actuation of said signal solenoid, a universal solenoid for actuating said universal lever of said slave machine, and a normally open circuit between said universal solenoid and said master machine which is closable by any of said master machine switches to energize said universal solenoid and thus impart motion to the paper.

6. A remote control system for a key operated machine that records language on paper in printed characters in which machine any number of characters are printed substantially simultaneously by actuation of the keys and motion is imparted to the paper by a universal lever upon actuation of any number of keys, which system comprises a master machine having keys that are actuated for recording language, a remote slave machine similar to the master machine and containing corresponding keys for recording language, solenoids adjacent keys of said slave machine for actuating said keys including a signal solenoid which acts upon one of said keys, key relays corresponding to the keys on said master machine and having normally open first and second contacts closable upon energization of said key relays, normally open relay circuits between each of said key relays and said master machine, a source of direct current for said relay circuits, master machine switches corresponding to said keys on the master machine and closable upon actuation of such master machine keys to make circuits to the corresponding relays and energize said key relays, normally open solenoid circuits between said solenoids and said first contacts of said key relays which circuits are respectively closed upon energization of said key relays to energize said corresponding solenoids and actuate the corresponding keys on said slave machine, a universal solenoid for actuating said universal lever of said slave machine, a normally open solenoid circuit between said universal solenoid and said second contacts of said key relays which is closed when any of said key relays are energized by closing of any of said master machine switches on said master machine thereby energizing said universal solenoid and imparting motion to the paper, a source of direct current for said solenoid circuits, a normally open signal circuit between said signal solenoid and said second contacts of said key relays which is partially closed when any of said key relays are energized upon closing any of said master machine switches, a separate signal relay with normally open contacts connected in said signal circuit, a manually operable switch, and a circuit between said manually operable switch and said signal relay which is closable to energize said signal relay and complete said signal circuit when any of said master machine switches is closed.

7. A remote control system for a key operated machine that records language on paper in printed characters in which machine any number of characters are printed substantially simultaneously by actuation of the keys and motion is imparted to the paper by a universal lever upon actuation of any number of keys, which system comprises a master machine having keys that are actuated for recording language, a remote slave machine similar to the master machine and containing corresponding keys for recording language, solenoids for actuating the keys of said slave machine, normally open circuits between each of said solenoids and said master machine, switches corresponding to said keys on the master machine and closable upon actuation of such master machine keys to make circuits to the corresponding solenoids and actuate the corresponding keys on said slave machine, a universal solenoid for actuating the universal lever of said slave machine, a normally open universal solenoid circuit, and means for closing said universal solenoid circuit prior to substantial movement of the universal lever of said slave machine upon activation of any of said master machine keys to thereby cause energization of said universal solenoid and impart motion to the paper.

8. A remote control system for a key operated machine that records language on paper in printed characters in which machine any number of characters are printed substantially simultaneously by actuation of the keys and motion is imparted to the paper by a universal lever upon actuation of any number of keys, which system comprises a master machine having keys that are actuated for recording language, a remote slave machine similar to the master machine and containing corresponding keys for recording language, solenoids for actuating the keys of said slave machine, normally open key solenoid circuits connected to each of said solenoids, means corresponding to said keys on the master machine and selected by actuation of such master machine keys to make key solenoid circuits to the corresponding solenoids and actuate keys on said slave machine corresponding to the keys actuated on said master machine, a universal solenoid for actuating the universal lever of said slave machine, a normally open universal solenoid circuit, and means for closing said universal solenoid circuit prior to substantial movement of the universal lever of said slave machine substantially simultaneously with making of said key solenoid circuits to thereby cause energization of said universal solenoid and impart motion to the paper.

References Cited in the file of this patent

UNITED STATES PATENTS

| | | |
|---|---|---|
| 1,520,478 | More | Dec. 23, 1924 |
| 1,996,013 | Thompson | Mar. 26, 1935 |
| 2,593,371 | Watson | Apr. 15, 1952 |